United States Patent
Lee et al.

(10) Patent No.: US 8,992,737 B2
(45) Date of Patent: *Mar. 31, 2015

(54) TRIHALOSILANE REFINING METHOD

(71) Applicant: LG Chem, Ltd., Seoul (KR)

(72) Inventors: Sung Kyu Lee, Daejeon (KR); Joon Ho Shin, Daejeon (KR); Jong Ku Lee, Daejeon (KR); Sung Kyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,373

(22) Filed: Nov. 25, 2013

(65) Prior Publication Data
US 2014/0076709 A1    Mar. 20, 2014

Related U.S. Application Data

(63) Continuation of application No. PCT/KR2012/009512, filed on Nov. 12, 2012.

(30) Foreign Application Priority Data

Nov. 11, 2011 (KR) .......................... 10-2011-117353

(51) Int. Cl.
*B01D 3/14* (2006.01)
*B01D 3/42* (2006.01)
*C01B 33/107* (2006.01)

(52) U.S. Cl.
CPC .......... *C01B 33/10778* (2013.01); *B01D 3/141* (2013.01); *Y10S 203/20* (2013.01)
USPC ............... 203/2; 202/154; 202/158; 202/160; 202/172; 203/73; 203/80; 203/99; 203/DIG. 19; 556/476; 556/484

(58) Field of Classification Search
CPC .......... B01D 3/141; B01D 3/143; B01D 3/42; B01D 3/4211; B01D 3/4261; B01D 3/4283; C01B 33/10778
USPC ............ 556/400, 476, 484; 203/2, 73, 80, 99, 203/DIG. 19; 261/128, 129, 146; 202/154, 202/155, 158, 160, 172
See application file for complete search history.

(56) References Cited

U.S. PATENT DOCUMENTS 2,618,646 A * 11/1952 Hatcher et al. ................. 556/431
3,310,578 A * 3/1967 Bluestein ...................... 556/442

(Continued)

FOREIGN PATENT DOCUMENTS

KR   10-2010-0042933 A   4/2010
KR   10-2010-0070485 A   6/2010

(Continued)

OTHER PUBLICATIONS

Triantafyllou et al, "The Design and Optimisation of Fully Thermally Coupled Distillation Columns" Trans I Chem, vol. 70, Mar. 1992, pp. 118-132.CFJ.*

*Primary Examiner* — Virginia Manoharan
(74) *Attorney, Agent, or Firm* — McKenna Long & Aldridge, LLP

(57) ABSTRACT

A trihalosilane refining device and a trihalosilane refining method are provided. The trihalosilane refining device can be useful in obtaining high-purity trihalosilane from a feed containing a trihalosilane while consuming a small amount of energy.

7 Claims, 5 Drawing Sheets

(56) References Cited

U.S. PATENT DOCUMENTS

| | | | |
|---|---|---|---|
| 5,837,107 A * | 11/1998 | Watzenberger et al. | 203/78 |
| 6,240,744 B1 * | 6/2001 | Agrawal et al. | 62/643 |
| 6,846,389 B2 * | 1/2005 | Kaibel et al. | 203/1 |
| 7,001,490 B2 * | 2/2006 | Wostbrock et al. | 203/1 |
| 7,249,469 B2 * | 7/2007 | Porter | 62/620 |
| 7,267,746 B1 * | 9/2007 | Harris et al. | 202/158 |
| 7,462,277 B2 * | 12/2008 | Adrian et al. | 208/115 |
| 8,092,655 B2 * | 1/2012 | Burst et al. | 203/1 |
| 8,246,816 B2 * | 8/2012 | Schultz et al. | 208/347 |
| 2004/0045804 A1 * | 3/2004 | Bohner et al. | 203/1 |
| 2005/0199482 A1 * | 9/2005 | Heida | 203/50 |
| 2007/0043217 A1 * | 2/2007 | Siegert et al. | 544/358 |
| 2010/0320072 A1 * | 12/2010 | Schwarz et al. | 203/81 |
| 2011/0303526 A1 * | 12/2011 | Lee et al. | 203/81 |

FOREIGN PATENT DOCUMENTS

| | | |
|---|---|---|
| KR | 10-2010-0105500 A | 9/2010 |
| WO | 2010-085072 * | 7/2010 |

* cited by examiner

TRIHALOSILANE REFINING METHOD

This application is a Continuation Bypass Application of International Patent Application No. PCT/KR2012/009512, filed Nov. 12, 2012, and claims the benefit of Korean Patent Application No. 10-2011-117353 filed on Nov. 11, 2011 in the Korean Intellectual Property Office, the disclosures of which are incorporated herein by reference.

TECHNICAL FIELD

The present application relates to a trihalosilane refining device and a trihalosilane refining method.

BACKGROUND

Processes of preparing polycrystalline silicon which is a source of monocrystalline silicon may be mainly divided into a Siemens technique and a fluidized-bed reactor (FBR) technique. Here, polycrystalline silicon produced through the Siemens technique accounts for 90% of the total output all over the world.

The Siemens technique includes a process using trichlorosilane as a source and a process using monosilane as a source. Here, the monosilane has problems in that it is highly explosive, and a large amount of by-products are produced during a manufacturing process. Therefore, a technique using the trichlorosilane has been widely used in the related art.

Patent Document 1 discloses a method of refining trichlorosilane as described above. However, methods disclosed in prior-art documents including Patent Document 1 have problems in that an excessive amount of energy is consumed during production of products, and the produced products have a poor degree of purity.

Prior-Art Document

Patent Document 1: Japanese Patent Laid-open Publication No. 2002-234721

DESCRIPTION

Technical Object

The present application provides a trihalosilane refining device and a trihalosilane refining method.

Technical Solution

Illustrative trihalosilane refining device may include a divided wall distillation column (DWC) installed to enable an inflow of a feed containing a trihalosilane, and a first distillation column coupled to the divided wall distillation column. The divided wall distillation column may have at least one inlet port and at least three outlet ports formed therein. The divided wall distillation column of the trihalosilane refining device may be designed so that the feed can be introduced through the inlet port, and an effluent containing the refined trihalosilane can be extruded through one of the three outlet ports.

For example, the trihalosilane may be trichlorosilane. The trihalosilane introduced into the divided wall distillation column, for example, trichlorosilane, may be prepared using conventional methods known in the related art. For example, trichlorosilane may be prepared by allowing metallic silicon and hydrochloric acid, which is generally in a gas phase, to react at a high temperature, for example, approximately 300° C. to approximately 400° C. In addition to the trichlorosilane, a reaction product containing the trichlorosilane prepared by the above-described method includes hydrogen, unreacted hydrochloric acid, or a chlorosilane such as such as tetrachlorosilane or dichlorosilane.

The divided wall distillation column included in the trihalosilane refining device is a so-called device designed to process a feed containing three components having a low boiling point, a middle boiling point and a high boiling point. The divided wall distillation column is a so-called device similar to a Petlyuk distillation column in a thermodynamic aspect. The Petlyuk distillation column is designed to have a structure in which a preliminary separator and a main separator are thermally integrated so that a low boiling point material and a high boiling point material can be primarily separated at the preliminary separator, components present in upper and lower column portions of the preliminary separator can flow into a feed plate of the main separator, and the low boiling point material, the middle boiling point material and the high boiling point material can be finally separated at the main separator. In addition, the divided wall distillation column is configured with divided walls installed in the column so as to integrate the preliminary separator into the main separator.

FIG. 1 is a diagram showing a divided wall distillation column 100 according to one illustrative embodiment. As shown in FIG. 1, the distillation column 100 according to one illustrative embodiment may have a structure in which an inner part of the distillation column 100 is divided by a divided wall 101 and which has a condenser 102 and a reboiler 103 formed respectively in upper and lower portions thereof. The inner part of the divided wall distillation column 100 may be imaginarily divided by dotted lines shown in FIG. 1, for example, divided into an upper column region 104, a lower column region 105, a preliminary separation region 106, and a main separation region 107. The term "upper column region" refers to an upper region of the distillation column 100 as schematically shown in FIG. 1, that is, a region 104 in which no divided wall is formed, and the term "lower column region" refers to a lower region of the distillation column 100 as schematically shown in FIG. 1, that is, a region 105 in which no divided wall is formed. Also, the term "preliminary separation region" may refer to a region 106 in which an inlet port through which a feed F is supplied is present in spaces divided by the divided wall 101 as schematically shown in FIG. 1, and the term "main separation region" may refer to a region 107 in which an outlet port through which an effluent EM flows out is present in the spaces divided by the divided wall 101 as schematically shown in FIG. 1. Typically, a low boiling point component and a high boiling point component contained in the feed F may be mainly separated at the preliminary separation region 106 of the divided wall distillation column 100, and a middle boiling point component may be mainly separated at the main separation region 107.

Unless expressly specified otherwise, the terms "low boiling point component," "middle boiling point component" and "high boiling point component" may be used as relative concepts, for example, may refer to components defined by dividing the respective components present in a feed into approximately three equal parts according to boiling points, or components flowing out respectively through first to third outlet ports, as will be described later, upon operation of the divided wall distillation column. In the case of the latter, the component (for example, EU shown in FIG. 1) flowing out through the first outlet port may be defined as a low boiling point component, the component (for example, EM shown in FIG. 1) flowing out through the second outlet port may be defined as a middle boiling point component, and the component (for example, ED shown in FIG. 3) flowing out through the third outlet port may be defined as a high boiling point component.

As shown in FIG. 1, the divided wall distillation column of the trihalosilane refining device may be formed with the upper and lower column regions 104 and 105 open. In addition to the structure shown in FIG. 1, for example, the divided wall distillation column may have a structure in which the divided wall 101 shown in FIG. 1 extends to an upper portion of the distillation column with no open upper column region 104, or in which the divided wall 101 extends to a lower portion of the distillation column with no open upper column region 104 according to a design. However, the divided wall distillation column applied to the trihalosilane refining device may desirably have a structure in which the upper and lower column regions are open, that is, a structure in which no divided wall is present in the upper column region of the distillation column and no divided wall is present in the lower column region of the distillation column either. According to such a structure, it is possible to ensure a stream of a material (a liquid or a gas) between the preliminary separation region and the main separation region through the upper and lower column regions, thereby achieving excellent separation efficiency.

In the divided wall distillation column, an open length of the open upper and/or lower column region (that is, a length of a region in which no divided wall is present in the upper column region, for example, a distance between a lower portion of the upper column region and an upper portion of the divided wall and/or a length of a region in which no divided wall is present in the lower column region, for example, a distance between an upper portion of the lower column region and a lower portion of the divided wall) may, for example, be in a range of approximately 800 mm to 3,500 mm, or approximately 1,200 mm to 2,500 mm. Within this length range, it is possible to ensure a smooth stream of a material between the preliminary separation region and the main separation region and maintain constant pressures in the preliminary separation region and the main separation region, thereby enhancing separation efficiency, etc.

A plate number of the divided wall distillation column may, for example, be properly selected in consideration of the type of the distillation column and desired separation efficiency. For example, when a distillation column having a packing type such as a structured packing type is used in the divided wall distillation column, the plate number of the distillation column may be the same as the theoretical plate number. Also, a distillation column having a specific surface area of approximately 220 sqm/cum to 500 sqm/cum may be used as the distillation column having such a packing type. When the specific surface area of the distillation column is less than 220 sqm/cum, a significant increase in total height of the distillation column may be caused. On the other hand, when the specific surface area of the distillation column exceeds 500 sqm/cum, streams of a liquid phase and a gas phase may not smoothly occur due to a decrease in internal pressure of the distillation column.

Also, when a distillation column having a tray type is used as the divided wall distillation column, the distillation column may be designed to have a plate number so that separation efficiency can be maintained at a level of approximately 50% to 80% with respect to the theoretical plate number. When the distillation column is designed so that the separation efficiency is maintained at a level less than approximately 50%, a low boiling point material and a high boiling point material may not be effectively separated at the preliminary separation region, which results in degraded purity of a product. On the other hand, when the distillation column is designed so that the separation efficiency exceeds 80%, it is difficult to maintain smooth equilibrium streams between liquid and gas phases of a low boiling point material and a middle boiling point material and liquid and gas phases of a middle boiling point material and a high boiling point material, or the separation efficiency may be deteriorated.

When the distillation column has a tray type, a gap between trays in a divided wall section of the distillation column, for example, a section indicated by the mark 'DW' shown in FIG. 1 may be selected within a range of approximately 200 mm to 1,500 mm. When the gap between the trays is less than 200 mm, it is difficult to install, maintain and fix the distillation column. On the other hand, when the gap between the trays exceeds 1,500 mm, an increase in manufacturing cost may be caused.

Also, in the divided wall distillation column, the length of the divided wall (for example, a length indicated by 'DW' shown in FIG. 1) may be adjusted according to compositions of a feed. For example, the length of the divided wall of the divided wall distillation column may be determined at a level of approximately 30% or more, or 40% or more with respect to the total theoretical plate number. The term "total theoretical plate number" means a higher one of the sum of theoretical plate numbers of the upper column region, the main separation region and the lower column region of the divided wall distillation column, and the sum of theoretical plate numbers of the upper column region, the preliminary separation region and the lower column region. As is known in the related art, the theoretical plate number may be calculated according to an equilibrium distillation curve for the compositions of a component present in the preliminary or main separation region.

When the length of the divided wall is less than 30% of the total theoretical plate number, proper separation is not performed at the preliminary separation region, which results in degraded production efficiency or degraded purity of a final product. An upper limit of the length of the divided wall is not particularly limited, but may be determined without particular limitation as long as it can be set to a value at which smooth flow of a material at the upper and lower column regions is ensured. For example, the upper limit of the length of the divided wall may be approximately 100%, 90% or less, 80% or less, or 70% or less with respect to the total theoretical plate number.

FIG. 2 is a graph illustrating a concentration profile of trichlorosilane in the main separation region of the divided wall section. The graph of FIG. 2 is shown for trichlorosilane refined according to conditions described in Examples to be described later. Also, the concentration profile in which the length of the divided wall accounts for 20%, 40% or 50% with respect to the total theoretical plate number is shown in FIG. 2. In FIG. 2, the X axis represents a position of the divided wall section in a length direction, and the Y axis represents a mass fraction of trichlorosilane in the position of the divided wall section. When the length of the divided wall is less than 30% of the total theoretical plate number as shown in FIG. 2, it can be seen that purity of a final product may be degraded due to a drastic decrease in separation efficiency at the preliminary separation region.

The divided wall distillation column may include an inlet port and an outlet port. For example, the distillation column may include one or more inlet ports installed to introduce a feed into the preliminary separation region. Also, the distillation column may include at least a first outlet port through which a component present at the upper column region may flow out, a second outlet port through which a component present at the main separation region may flow out, and a third outlet port through which a component present at the lower column region may flow out. In the structure, a feed containing a trihalosilane is introduced through the inlet port. Then, a low boiling point component in the feed may flow out through the first outlet port, and a high boiling point component in the feed may flow out through the third outlet port. The trihalosilane which is a target compound, for example, trichlorosilane, is typically included in a middle boiling point component. Therefore, in this structure, an effluent containing the refined trichlorosilane may flow out through the second outlet port.

According to one illustrative embodiment, the inlet port of the divided wall distillation column may be installed to introduce the feed into the preliminary separation region, and the inlet port may also be installed at a 1/10 to 9/10 section of the preliminary separation region. The inlet port may, for example, be installed at a 1/10 to 8/10, 1/10 to 7/10, 1/10 to 6/10, or 1/10 to 5/10 section of the preliminary separation region. The term "n/m section of a preliminary separation region" may refer to a point spaced apart from the uppermost portion (an upper column region) of the preliminary separation region by n/m times a length of the preliminary separation region when the length of the preliminary separation region is divided into m equal parts. Therefore, the term "1/10 to 9/10 section of a preliminary separation region" may refer to a section spanning from a point spaced apart from the uppermost portion (an upper column region) of the preliminary separation region by 1/10 times the length of the preliminary separation region to a point spaced apart from the uppermost portion of the preliminary separation region by 9/10 times the length of the preliminary separation region when the length (for example, a length indicated by 'DW' shown in FIG. 1) of the preliminary separation region is divided into 10 equal parts. When the feed is introduced into the preliminary separation region as described above, a high boiling point material and a low boiling point material may be properly separated at the preliminary separation region, thereby maintaining excellent purity and production efficiency of a final product.

Also, the second outlet port may, for example, be formed at a 1/9 to 8/9 section of the divided wall section of the main separation region. The second outlet port may also be formed at a 2/9 to 8/9 section, a 3/9 to 8/9 section, a 4/9 to 8/9 section, a 5/9 to 8/9 section, or a 6/9 to 8/9 section of the divided wall section. The term "n/m section of a divided wall section" may refer to a point spaced apart from the uppermost portion (an upper column region) of the main separation region or the divided wall section by n/m times a length of the main separation region or the divided wall section when the length of the main separation region or the divided wall section is divided into m equal parts. Therefore, the term "1/9 to 8/9 section of a divided wall section" may refer to a section spanning from a point spaced apart from the uppermost portion (an upper column region) of the main separation region or the divided wall section by 1/9 times the length of the main separation region or the divided wall section to a point spaced apart from the uppermost portion of the main separation region or the divided wall section by 8/9 times the length of the main separation region or the divided wall section when the length (for example, a length indicated by 'DW' shown in FIG. 1) of the main separation region or the divided wall section is divided into 9 equal parts. As a result, a target material such as trichlorosilane may be prevented from being mixed again with the high boiling point material or the low boiling point material at the main separation region, thereby maintaining excellent purity and production efficiency of a final product.

FIG. 3 is a graph illustrating a concentration profile of trichlorosilane in the main separation region of the divided wall section of the divided wall distillation column. The graph of FIG. 3 is shown for trichlorosilane refined according to methods described in Examples to be described later. In the graph of FIG. 3, the X axis represents a point of the divided wall section in a length direction (Top indicated on the X axis represents an end of the upper column region in the divided wall section, and Btm represents an end of the lower column region in the divided wall section), and the Y axis represents a mass fraction of trichlorosilane. As shown in FIG. 3, when the divided wall section is formed out of position from the 1/9 to 8/9 section, a mass fraction of trichlorosilane may be reduced. Therefore, when an outlet port is present in a section lower than the 1/9 section, a target compound may be mixed with the low boiling point material, which leads to degraded purity of the compound. On the other hand, when an outlet port is present in a section higher than the 8/9 section, a target compound may be mixed with the high boiling point material, which also leads to degraded purity of the compound.

When the feed containing the finely refined trihalosilane is introduced into the divided wall distillation column, the feed may be separated into a low boiling point component and a high boiling point component at the preliminary separation region. The low boiling point component and the high boiling point component separated at the preliminary separation region may refer to a component having a higher boiling point and a component having a lower boiling point, respectively, when the respective components of the feed are divided into approximately two equal parts according to the boiling point. Some of the separated low and high boiling point components flow in through the first outlet port of the upper column region and the third outlet port of the lower column region, respectively, and the remaining components flow in the main separation region, and then are distilled again. In this case, the low and middle boiling point components may be mainly separated at an upper region of the main separation region, and the middle and high boiling point components may be mainly separated at a lower region of the main separation region. After the low boiling point component separated thus passes through the upper column region, the first outlet port and the condenser, for example, some of the low boiling point component may flow out, or flow in an additional distillation column, and the remaining low boiling point component may return to the upper column region by reflux. Also, after the separated high boiling point component passes through the lower column region, the third outlet port and the reboiler, some of the high boiling point component may flow out, or flow in an additional distillation column, and the remaining high boiling point component may return to the lower column region by reflux.

As such, the second outlet port may, for example, be installed so that a temperature of the second outlet port or the component flowing out through the second outlet port, that is, a component containing a trihalosilane that is a target compound, can satisfy the following Expression 1.

$$0.0132P^3 - 0.624P^2 + 12.673P + 41.371 \leq Tm \leq 0.0132P^3 - 0.624P^2 + 12.673P + 51.371 \quad \text{Expression 1}$$

In Expression 1, Tm represents a temperature of the second outlet port or the component flowing out through the second outlet port, and P represents an operating pressure of the upper column region of the divided wall distillation column.

The respective components in the feed may be effectively separated by installing the second outlet port so as to satisfy Expression 1.

Meanwhile, in the divided wall distillation column, the first outlet port may, for example, be installed so that a temperature of the first outlet port or the component flowing out through the first outlet port can satisfy the following Expression 2.

$$0.0139P^3 - 0.6467P^2 + 12.692P + 27.716 \leq Tt \leq 0.0139P^3 - 0.6467P^2 + 12.692P + 37.716 \quad \text{Expression 2}$$

In Expression 2, Tt represents a temperature of the first outlet port or the component flowing out through the first outlet port, and P represents an operating pressure of the upper column region of the divided wall distillation column.

The respective components in the feed may be effectively separated by installing the first outlet port so as to satisfy Expression 2.

Also, in the divided wall distillation column, the third outlet port may, for example, be installed so that a temperature of the third outlet port or the component flowing out through the third outlet port can satisfy the following Expression 3.

$$\beta 0.016P^3 - 0.7386P^2 + 14.3P + 78.759 \leq Tb \leq 0.016P^3 - 0.7386P^2 + 14.3P + 88.759 \quad \text{Expression 3}$$

In Expression 3, Tb represents a temperature of the third outlet port or the component flowing out through the third outlet port, and P represents an operating pressure of the upper column region of the divided wall distillation column.

The respective components in the feed may be effectively separated by installing the third outlet port so as to satisfy Expression 3.

In Expressions 1 to 3, specific ranges of P, Tt, Tb and/or Tm may be selected in consideration of process efficiency, etc. For example, the operating pressure P of the upper column region may be set within a range of approximately 1.3 Kg/sqcmG to 23 Kg/sqcmG at an operating temperature in consideration of process efficiency, etc. Also, the temperature Tt of the first outlet port or the component flowing out through the first outlet port may, for example, be in a range of approximately 72.2° C. to 102.2° C., or approximately 82.2° C. to 92.2° C. at a pressure of approximately 5.8 Kg/sqcmG, the temperature Tm of the second outlet port or the component flowing out through the second outlet port may be in a range of approximately 86.4° C. to 116.4° C., or approximately 96.4° C. to 106.4° C. at a pressure of approximately 5.8 Kg/sqcmG, and the temperature Tb of the third outlet port or the component flowing out through the third outlet port may be in a range of approximately 129.9° C. to 159.9° C., or approximately 139.9° C. to 149.9° C. at a pressure of approximately 5.8 Kg/sqcmG. In particular, when the temperature in each outlet port is adjusted within this temperature range, energy required in the condenser or the reboiler may be curtailed during a subsequent process, for example, a distillation process in the first distillation column coupled to the divided wall distillation column. The temperatures Tb, Tm and Tt may satisfy the relation of Tb>Tm>Tb. Also, the temperatures Tb, Tm and Tt applied to Expressions 1 to 3 represent temperatures of the respective outlet ports or the components flowing out through the outlet ports under an outflow pressure applied during operation of the divided wall distillation column. As such, the temperature of the component flowing out through each outlet port may also refers to a temperature of the component at a point of time at which the component flows out through each outlet port, or a temperature of the component after the component flows out through each outlet port, followed by going through the condenser or reboiler. Typically, the temperature of the component may refer to a temperature after the component flowing out through each outlet port goes through the condenser or reboiler.

The trihalosilane refining device may further include a first distillation column coupled to the divided wall distillation column. For example, the first distillation column may be coupled to the divided wall distillation column to introduce the component flowing out through the second outlet port of the divided wall distillation column. Therefore, the trihalosilane flowing out from the divided wall distillation column may be further refined to obtain a desired product with higher purity. As the first distillation column, a conventional distillation column known in the related art may be used without limitation in consideration of separation efficiency, etc. Also, the theoretical plate number, the operating temperature and the operating pressure of the first distillation column are not particularly limited either, and may be properly selected in consideration of a feed to be introduced. For example, the first distillation column may include conventional distillation columns. Here, a distillation column having a theoretical plate number of approximately 20 to 100 or approximately 30 to 60 may be used as the first distillation column. Also, the operating pressure and the operating temperature of the distillation column may be in a range of approximately −0.6 Kg/sqcmG to 9.0 Kg/sqcmG, and approximately 37° C. to 145° C., respectively. In particular, when the temperature of the feed flowing out from the divided wall distillation column and introduced into the first distillation column, for example, an outflow temperature through the second outlet port, is maintained within this temperature range, energy consumed at the first distillation column during the distillation process may be drastically curtailed.

Also, the trihalosilane refining device may further include a second distillation column configured to refine the component flowing out from the divided wall distillation column, for example, a high boiling point component. In this case, the second distillation column may be coupled to the divided wall distillation column to introduce the component flowing out through the third outlet port of the divided wall distillation column. As necessary, among the components refined at the second distillation column, the high boiling point component, that is, a component flowing out from a lower portion of the second distillation column, may be recycled and re-used as a source for preparing a trihalosilane. As the second distillation column, a conventional distillation column known in the related art may be used without particular limitation in consideration of separation efficiency, etc. Also, the theoretical plate number, the operating temperature and the operating pressure of the second distillation column are not particularly limited, and may be properly selected in consideration of a feed to be introduced. For example, the second distillation column may include conventional distillation columns. Here, a distillation column having a theoretical plate number of approximately 20 to 100 or approximately 30 to 60 may be used as the second distillation column. Also, the operating pressure and the operating temperature of the distillation column may be in a range of approximately 0.1 Kg/sqcmG to 52.5 Kg/sqcmG, and approximately 37° C. to 223.5° C., respectively. In particular, when the temperature of the feed flowing out from the divided wall distillation column and introduced into the second distillation column, for example, an outflow temperature through the third outlet port, is maintained within this temperature range, energy consumed at the second distillation column during the distillation process may be drastically curtailed.

Also, the trihalosilane refining device may further include a third distillation column coupled to the first distillation column to enable inflow of an effluent flowing out from the first distillation column, for example, an effluent flowing out from a lower portion of the first distillation column. The trihalosilane may be further refined at the third distillation column to obtain a target compound with higher purity.

As the third distillation column, a conventional distillation column known in the related art may be used without particular limitation in consideration of separation efficiency, etc. Also, the theoretical plate number, the operating temperature and the operating pressure of the third distillation column are not particularly limited, and may be properly selected in consideration of a feed to be introduced. For example, the third distillation column may include conventional distillation columns. Here, a distillation column having a theoretical plate number of approximately 5 to 60 or approximately 10 to 40 may be used as the third distillation column. Also, the operating pressure and the operating temperature of the distillation column may be in a range of approximately 0.1 Kg/sqcmG to 50.5 Kg/sqcmG, and approximately 37° C. to 219.5° C., respectively.

Conventional distillation columns may be used as the first to third distillation columns. Each of the distillation columns may include a conventional condenser and reboiler. For example, a vertical thermosyphon having a natural circulation mode and a distillation column having a forced circulation mode may be applied to inhibit fouling in the distillation columns.

Another aspect of the present application provides a trihalosilane refining method. The trihalosilane refining method according to one illustrative embodiment of the present application may be performed using the above-described trihalosilane refining device. For example, the trihalosilane refining method may include introducing a feed containing a trihalosilane into a divided wall distillation column (DWC), and introducing an effluent containing the trihalosilane flowing out from the divided wall distillation column into a first distillation column coupled to the divided wall distillation column.

In this procedure, the distillation column as described above may be used as the divided wall distillation column. Also, the operating conditions of the distillation column are not particularly limited. For example, the operating conditions of the distillation column may be adjusted within a range satisfying one, two or all of Expressions 1 to 3 as described above, or may be adjusted within a range satisfying the specific temperatures and pressures obtained from Expressions 1 to 3. In this procedure, the flow rate or temperature of the feed introduced into the divided wall distillation column is not particularly limited. For example, the flow rate or temperature of the feed may be adjusted within a range satisfying one, two or all of Expressions 1 to 3 as described above, or may be adjusted within a range satisfying the specific temperatures and pressures obtained from Expressions 1 to 3.

The trihalosilane refining method may include introducing an effluent flowing out from the divided wall distillation column, for example, an effluent containing a trihalosilane, which flows out through the second outlet port, into the first distillation column. The distillation column as described above may be used as the first distillation column. As described above, the trihalosilane flowing out from the divided wall distillation column may be further refined at the first distillation column to obtain a target product with higher purity. The operating conditions of the first distillation column are not particularly limited. For example, the distillation column having a theoretical plate number of approximately 20 to 100 or approximately 30 to 60 as described above may be used, and run so that an operating pressure and an operating temperature can reach approximately −0.6 Kg/sqcmG to 9.0 Kg/sqcmG, and approximately 37° C. to 145° C., respectively. In this procedure, when the temperature of the feed introduced into the first distillation column, for example, an outflow temperature through the second outlet port, is maintained within this temperature range, energy consumed during the distillation process may be drastically curtailed.

Also, the trihalosilane refining method may further include introducing the component flowing out from the divided wall distillation column, for example, a component flowing out through the third outlet port present in the lower column region, into the second distillation column. The same kind of distillation column as described above may be used as the second distillation column.

The operating conditions of the second distillation column are not particularly limited. For example, a conventional distillation column having a theoretical plate number of approximately 20 to 100 or approximately 30 to 60 may be used, and run so that the operating pressure and the operating temperature can reach approximately 0.1 Kg/sqcmG to 52.5 Kg/sqcmG, and approximately 37° C. to 223.5° C., respectively. When the temperature of the feed flowing out from divided wall distillation column and introduced into the second distillation column, for example, an outflow temperature through the third outlet port, is maintained within this temperature range, energy consumed at the distillation column during the distillation process may be drastically curtailed.

Also, the trihalosilane refining method may further include introducing an effluent flowing out from the first distillation column, for example, an effluent flowing out from a lower portion of the first distillation column, into the additional third distillation column. In this case, the trihalosilane may be further refined at the third distillation column to obtain a target compound with higher purity.

The distillation column as described above may be used as the third distillation column. The operating conditions of the third distillation column are not particularly limited. For example, a distillation column having a theoretical plate number of approximately 5 to 60 or approximately 10 to 40 may be used, and run so that an operating pressure and an operating temperature can reach approximately 0.1 Kg/sqcmG to 50.5 Kg/sqcmG, and approximately 37° C. to 219.5° C., respectively.

Effects

According to the present application, the trihalosilane refining device can be useful in obtaining high-purity trihalosilane from a feed containing a trihalosilane while minimizing consumption of energy.

BRIEF DESCRIPTION OF PARTS IN THE DRAWINGS

Figure 1:
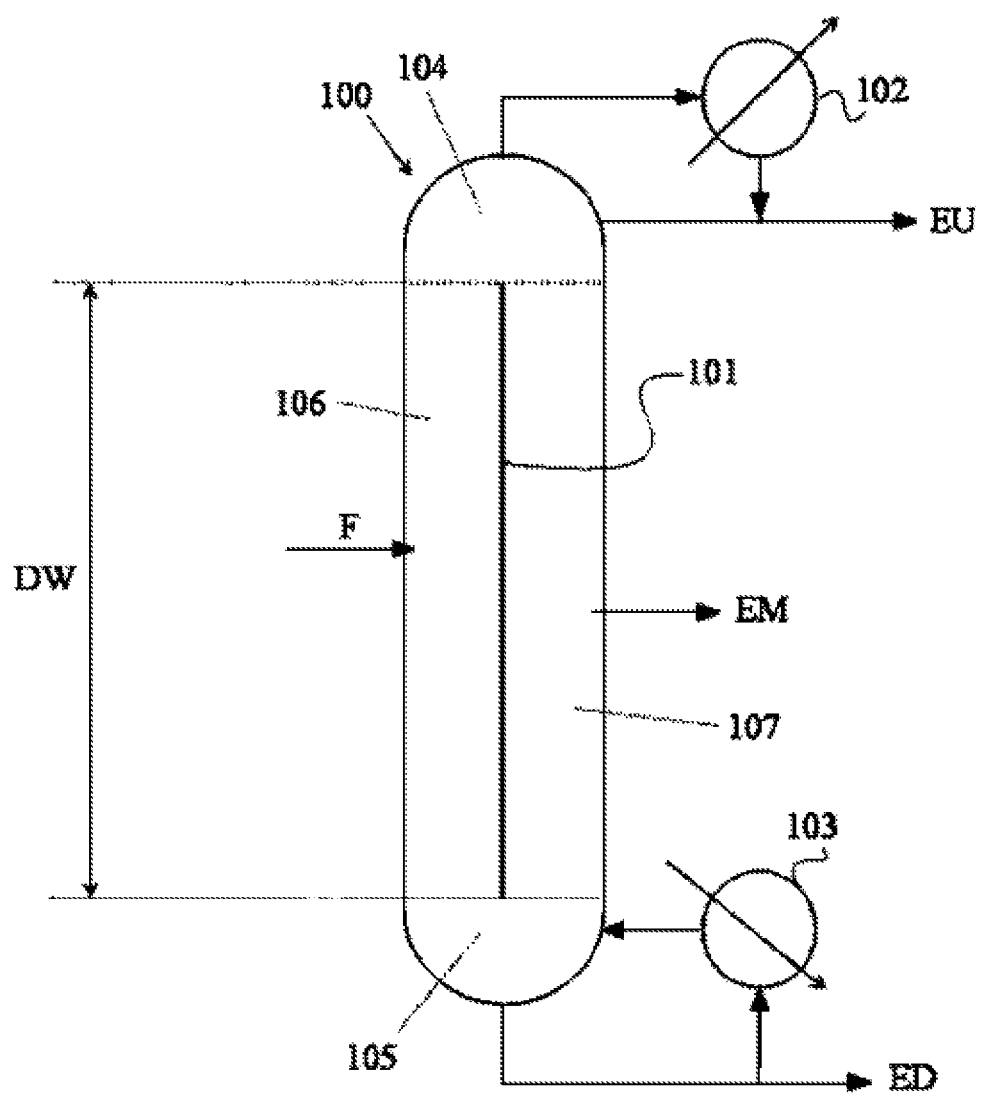
FIG. 1 is a diagram showing a divided wall distillation column according to one illustrative embodiment.
Figure 2:
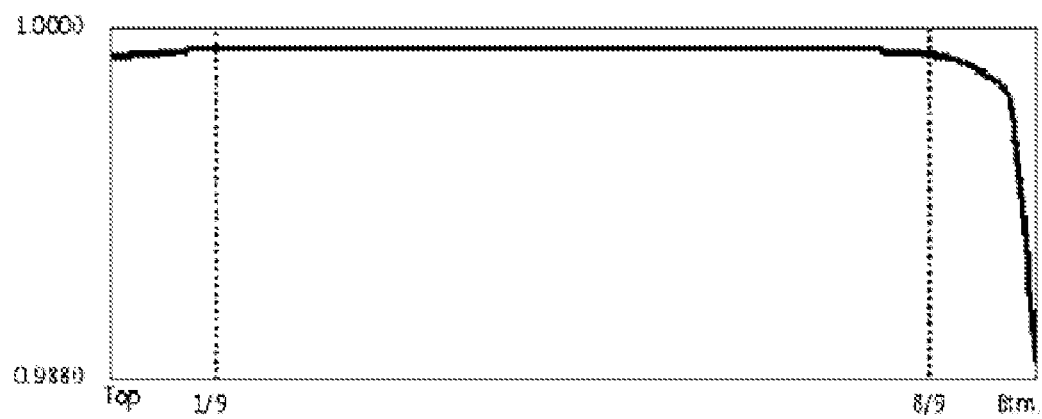
FIGS. 2 and 3 are graphs illustrating a concentration profile of trichlorosilane present in a divided wall section of a main separation region of the divided wall distillation column.
Figure 3:
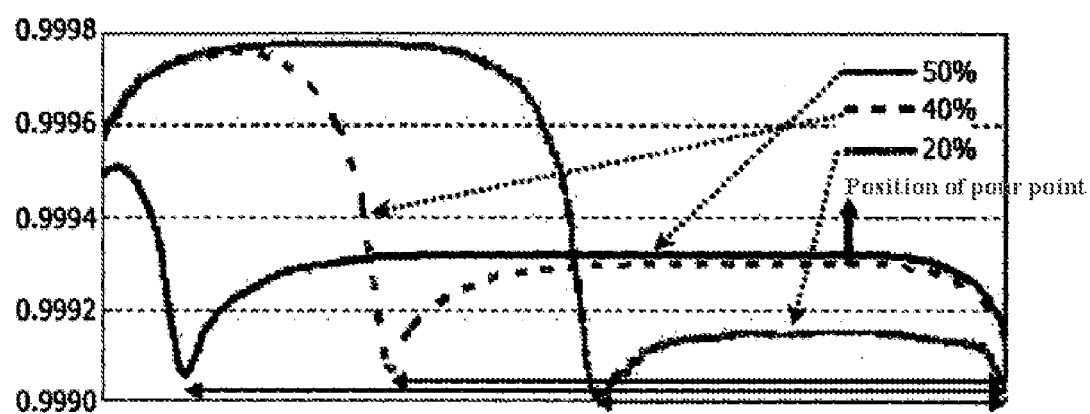

100 and 31: divided wall distillation column
101: divided wall

102: condenser
103: reboiler
104: upper column region
105: lower column region
106: preliminary separation region
107: main separation region
F: feed
EU, EM and ED: effluent
DW: divided wall section, preliminary or main separation region or length thereof.
32 to 34: first to third distillation columns of Example 1
41 to 45: first to fifth distillation columns of Comparative Example 1
A to K: respective streams in Example 1 or Comparative Example 1

Illustrative Embodiments

Hereinafter, the method will be described in detail referring to Examples and Comparative Examples; however the scope of the method is not limited to the below description.

EXAMPLE 1

Figure 4:
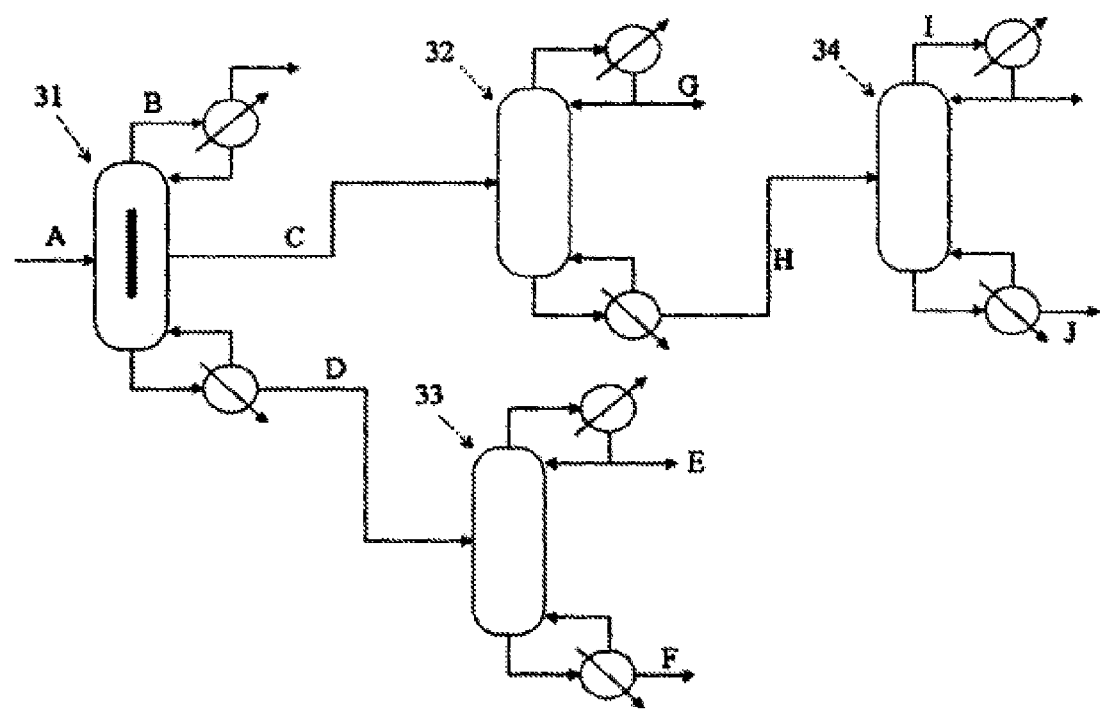
FIG. 4 is a diagram showing a trihalosilane refining device used in Example 1.

A trihalosilane refining device having a structure shown in FIG. 4, for example, a structure in which a divided wall distillation column 31, a first distillation column 32, a second distillation column 33 and a third distillation column 34 were coupled to each another, was used to prepare a feed containing trichlorosilane using a conventional method. Then, a simulation was performed on a process of refining the feed containing the trichlorosilane. The simulation was performed using Aspen Plus, and the conditions used for the simulation are listed in the following Tables 1 and 2. In the process, the feed introduced into the distillation column 31 was introduced through the outlet port installed at a point corresponding to 3/10 of a length of the preliminary separation region of the distillation column 31 from a top portion (an upper column region) of the preliminary separation region, and the effluent containing a trichlorosilane flowed out through the second outlet port installed at a point corresponding to 7/9 of a length of the divided wall section of the distillation column 31 from a top portion (an upper column region) of the divided wall section. Upon the simulation, an upper column pressure of the distillation column 31 was maintained at approximately 5.8 Kg/sqcmG. In the trihalosilane refining device, the length of the divided wall of the divided wall distillation column 31 was set to be approximately 30% with respect to the total theoretical plate number of the distillation column 31, and an upper column pressure of the distillation column 31 was maintained at approximately 5.8 Kg/sqcmG upon the simulation.

TABLE 1

| Items of divided wall distillation column 31 | Theoretical plate number |
| --- | --- |
| Upper column region | 18 |
| Preliminary separation region | 38 |
| Main separation region | 38 |
| Lower column region | 20 |

TABLE 2

| | First distillation column | Second distillation column | Third distillation column |
| --- | --- | --- | --- |
| Theoretical plate number | 45 | 40 | 24 |
| Feed introduction plate | 29 | 5 | 13 |

The results obtained for respective streams (indicated by A to J in FIG. 4) based on the simulation results are listed in the following Tables 3 and 4.

TABLE 3

| Stream No. | A | B | C | D | E | F | G | H | I | J |
| --- | --- | --- | --- | --- | --- | --- | --- | --- | --- | --- |
| Temperature (° C.) | 60.0 | 59.4 | 101.4 | 144.9 | 76.6 | 157.2 | 49.8 | 55.1 | 49.8 | 57.3 |
| Pressure (Kg/sqcmG) | 5.6 | 5.8 | 6.1 | 6.2 | 0.8 | 1.0 | 0.8 | 1.1 | 0.8 | 1.1 |
| Flow rate (Kg/hr) | 1,909 | 22 | 1,640 | 247 | 190 | 57 | 30 | 1,610 | 1,600 | 10 |
| Mass fraction (%) | | | | | | | | | | |
| HCl | 0.26 | 22.561 | 0 | 0 | 0 | 0 | 0 | 0 | 0 | 0 |
| DCS | 0.52 | 42.122 | 0 | 0 | 0 | 0 | 0 | 0 | 0 | 0 |
| BCL3 | 0.01 | 0.868 | 0 | 0 | 0 | 0 | 0 | 0 | 0 | 0 |
| TCS | 86.20 | 34.449 | 99.914 | 0.027 | 0.035 | 0 | 100 | 99.913 | 100 | 85.918 |
| STC | 10.00 | 0 | 0.086 | 76.710 | 99.723 | 0 | 0 | 0.087 | 0 | 14.082 |
| PCL3 | 0.01 | 0 | 0 | 0.077 | 0.1 | 0 | 0 | 0 | 0 | 0 |
| Heavies | 3.0 | 0 | 0 | 23.186 | 0.142 | 100 | 0 | 0 | 0 | 0 |

HCl: hydrochloric acid

DCS: dichlorosilane

BCL3: boron trichloride

TCS: trichlorosilane

STC: silicon tetrachloride

PCL3: phosphorus trichloride

Heavies: other high boiling point component

TABLE 4

| | Divided wall distillation column | First distillation column | Second distillation column | Third distillation column |
|---|---|---|---|---|
| Calorie consumption (Gcal/hr) | 2.300 | 0.017 | 1.613 | 1.161 |

COMPARATIVE EXAMPLE 1

Figure 5:
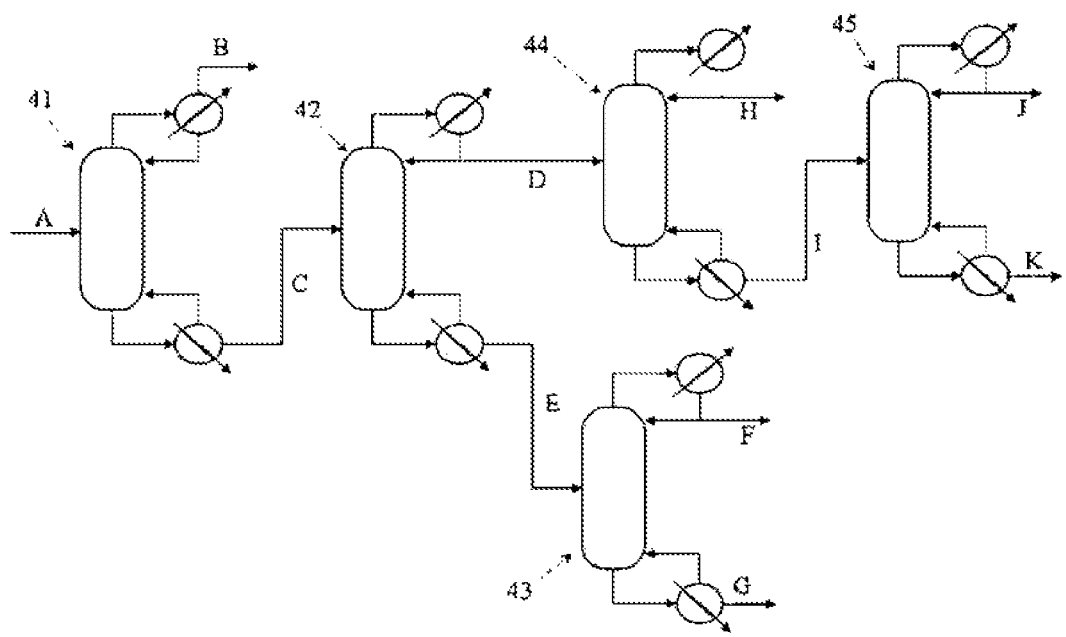
FIG. 5 is a diagram showing a trihalosilane refining device used in Comparative Example 1.

A trihalosilane refining device having a structure in which five conventional distillation columns were coupled to each another as shown in FIG. 5 was used to simulate a process of refining trichlorosilane present in the same feed as used in Example 1. The simulation was performed in the same Aspen Plus as used in Example 1. The conditions used for the simulation are listed in the following Table 5.

TABLE 5

| | First distillation column 41 | Second distillation column 42 | Third distillation column 43 | Fourth distillation column 44 | Fifth distillation column 45 |
|---|---|---|---|---|---|
| Theoretical plate number | 45 | 40 | 40 | 45 | 24 |
| Feed introduction plate | 13 | 11 | 11 | 9 | 13 |

The results obtained for respective streams (indicated by A to K in FIG. 5) based on the simulation results are listed in the following Tables 6 and 7.

TABLE 6

| Stream No. | A | B | C | D | E | F | G | H | I | J | K |
|---|---|---|---|---|---|---|---|---|---|---|---|
| Temperature (° C.) | 90.0 | 55.6 | 102.8 | 49.9 | 85.1 | 76.1 | 152.4 | 49.8 | 55.1 | 49.8 | 56.9 |
| Pressure (Kg/sqcmG) | 5.6 | 5.8 | 5.8 | 0.8 | 0.8 | 0.8 | 1.0 | 0.8 | 1.1 | 0.8 | 1.1 |
| Flow rate (Kg/hr) | 1909 | 20 | 1889 | 1640 | 249 | 190 | 59 | 30 | 1610 | 1600 | 10 |
| Mass fraction (%) | | | | | | | | | | | |
| HCl | 0.26 | 24.817 | 0 | 0 | 0 | 0 | 0 | 0 | 0 | 0 | 0 |
| DCS | 0.52 | 49.634 | 0 | 0 | 0 | 0 | 0 | 0 | 0 | 0 | 0 |
| BCL3 | 0 | 0.954 | 0 | 0 | 0 | 0 | 0 | 0 | 0 | 0 | 0 |
| TCS | 86.2 | 24.595 | 86.852 | 99.93 | 0.719 | 0.942 | 0 | 99.99996 | 99.929 | 100 | 89.494 |
| STC | 10 | 0 | 10.106 | 0.07 | 76.205 | 99.058 | 2.609 | 0.00004 | 0.071 | 0 | 11.056 |
| PCL3 | 0.02 | 0 | 0.01 | 0 | 0.076 | 0 | 0.323 | 0 | 0 | 0 | 0 |
| Heavies | 3 | 0 | 3.032 | 0 | 23 | 0 | 97.068 | 0 | 0 | 0 | 0 |

HCl: hydrochloric acid
DCS: dichlorosilane
BCL3: boron trichloride
TCS: trichlorosilane
STC: silicon tetrachloride
PCL3: phosphorus trichloride
Heavies: other high boiling point component

TABLE 7

| | First distillation column 41 | Second distillation column 42 | Third distillation column 43 | Fourth distillation column 44 | Fifth distillation column 45 |
|---|---|---|---|---|---|
| Calorie consumption (Gcal/hr) | 9.458 | 0.172 | 1.617 | 0.043 | 1.161 |

As seen from the results, it was revealed that the energy (2.300 Gcal/hr) consumed at the divided wall distillation column used in Example 1 was significantly lower than the energy (9.458 Gcal/hr+0.172 Gcal/hr) consumed at the first and second distillation columns 41 and 42 used in Comparative Example 1, which served as the divided wall distillation column used in Example 1. More particularly, it was confirmed that the energy was reduced by 7.330 Gcal/hr for an energy curtailment of approximately 76%. In comparison of the entire processes (the processes performed in the divided wall distillation column and the first to third distillation columns used in Example 1 versus the processes performed in the first to fifth distillation columns used in Comparative Example 1), it could be seen that the energy was reduced by approximately 7.36 Gcal/hr in Example 1 for an energy curtailment of approximately 59%, compared with Comparative Example 1.

What is claimed is:

1. A trihalosilane refining method, comprising:
introducing a feed containing a trihalosilane through an inlet port of a divided wall distillation column, which has an upper column region, a preliminary separation region, a main separation region and a lower column region formed therein and comprises the inlet port installed to introduce the feed containing the trihalosilane into the preliminary separation region, a first outlet port, a second outlet port and a third outlet port; and
introducing an effluent, which flows out through the second outlet port formed at the 1/9 to 8/9 section of the divided wall section of the main separation region, into a first distillation column, wherein the second outlet port or the effluent flowing out through the second outlet port is maintained at a temperature of 86.4° C. to 116.4° C., and wherein the first distillation column is maintained at an operating pressure of −0.6 Kg/sqcmG to 9.0 Kg/sqcmG and an operating temperature of 37° C. to 145° C.

2. The trihalosilane refining method of claim 1, wherein the feed is introduced through the inlet port installed at a 1/10 to 9/10 section of the preliminary separation region.

3. The trihalosilane refining method of claim 1, wherein the third outlet port is installed at the divided wall distillation column to enable outflow of a component in the lower column region, and the trihalosilane refining method further comprises introducing the component flowing out through the third outlet port into a second distillation column.

4. The trihalosilane refining method of claim 3, wherein the third outlet port or the effluent flowing out through the third outlet port is maintained at a temperature of 129.9° C. to 159.9° C. under a pressure of 5.8 Kg/sqcmG.

5. The trihalosilane refining method of claim 3, wherein the second distillation column is maintained at an operating pressure of 0.1 Kg/sqcmG to 52.5 Kg/sqcmG and an operating temperature of 37° C. to 223.5° C.

6. The trihalosilane refining method of claim 1, further comprising:
   introducing the effluent flowing out from a lower portion of the first distillation column into the third distillation column.

7. The trihalosilane refining method of claim 6, wherein the third distillation column is maintained at an operating pressure of 0.1 Kg/sqcmG to 50.5 Kg/sqcmG and an operating temperature of 37° C. to 219.5° C.

\* \* \* \* \*